Aug. 9, 1966　　YORIYUKI NIEDA　　3,266,003
NON-CONTACT POINT A.C. AND D.C. RELAY HAVING
DIRECTIONAL, TIME-LIMITING AND FORECASTING
PROPERTIES
Filed Nov. 9, 1962　　　　　　　　3 Sheets-Sheet 1

United States Patent Office 3,266,003
Patented August 9, 1966

3,266,003
NON-CONTACT POINT A.C. AND D.C. RELAY HAVING DIRECTIONAL, TIME-LIMITING AND FORECASTING PROPERTIES
Yoriyuki Nieda, 5 Matsugaoka, Kanagawa-ku, Yokohama, Japan
Filed Nov. 9, 1962, Ser. No. 236,646
Claims priority, application Japan, Nov. 11, 1961, 36/40,449
3 Claims. (Cl. 338—32)

The present invention relates to a non-contact point A.C. and D.C. relay having directional and time-limiting properties. More particularly, when an electric current is passed in one direction through a rotor comprising a semiconductor plate, and if an external magnetic field acts at right angles to the direction of such electric current, an electromotive force will occur at an end of the plate perpendicular to both directions by virtue of such E.M.F. an electric current is passed along a rotary coil and a rotating force occurs along the rotary coil, and then a circuit to be controlled is adapted to open and close by means of a rotary shaft including the semiconductor plate mounted on such shaft.

In the usual well-known relay the contact points are difficult to maintain and are subject to various defects which frequently cause operational errors that in turn affects other parts of the system such as a wrong operation (inoperation is also involved) of relays due to a defective contact in one relay that forms part of a relay system involving hundreds of unit relays. For instance, a pilot wire relay or carrier relay and the like in an electric power system, will have an important effect on the electric power system. Therefore, non-erroneous operational, in other words, non-contact point relays are strongly desired; however, time-limiting and directional non-contact point relays have not been available heretofore. In the example of induction relays, a rotary disc starts and the operation of the relay is completed first when the main contact point comes in contact, and therefore, it has been impossible for such relays to identify accidents on the way from the start to a point immediately before the contact point comes in contact.

Applicant's copending application Serial No. 96,014, now U.S. Patent No. 3,198,988, provides a solution for the above mentioned defects in providing non-contact point A.C. and D.C. relays with directional and time-limiting properties, and also being capable of announcing accidents. The substance of this invention lies in a relay, wherein between an upper and lower magnet poles is placed an electroconductive rotary shaft which has one or a plurality of semiconductive plates mounted thereto, each of such semiconductor plates being provided with both electromotive force terminal members which are connected to rotary coils wound in parallel around said rotary shaft and output wires which are drawn from both output terminal members provided on said semiconductor plates.

Further, in the present relay which is an improved embodiment of U.S. Patent No. 3,198,988, an intermediate procedure from starting to closing operations may be recorded simply or indicated by a pointer, whereby a remarkable advantage is accomplished in that it is extremely simple in this embodiment to time warning at any suitable point of the electromotive force of the divided cylindrical semiconductor.

Furthermore, according to the investigation by the present inventor, in the relay according to the above patent, semiconductor plates are made of flat plates. The flat semiconductor plate is substituted herein with a semiconductor plate of circular section or with an insulated cylindrical body which is adhered under vacuum with semiconductor films at positions corresponding to a plurality of divisions thereof, thereby ensuring a better result.

Thus, a relay of the above type, in which an electroconductive main rotary shaft is arranged between magnetic poles, which includes at least one or more than one semiconductor plate secured to the main rotary shaft, rotary coils wound parallel around the main rotary shaft and connected to both E.M.F. terminal members provided on the semiconductor plate that is provided with two output terminal members having output lead wires, has been modified in such a way that, in lieu of said semiconductor plates, plural divided portions of hollow cylindrical bodies of a circular arc section are provided, whereby one end of the rotary coil is connected with one of the E.M.F. terminal members through one of the oppositely curved plate faces of both semiconductor plates and the other end of the rotary coil is connected with the other one of the E.M.F. terminal members through the other one of the oppositely curved plate faces of both semiconductor plates respectively, and simultaneously the output lead wires are connected with both E.M.F. terminal members respectively provided on the other semiconductor plates opposite said semiconductor plates. Thus, in the present relay, which is an improved embodiment of the above patent, the electromotive force of the cylindrical semiconductor body is proportional to the product between the electric current and magnetic fluxes which pass through each of the divided cylindrical semiconductor plates respectively, and such electromotive force is proportional to the revolving force of the rotor, and since the rotary angle of the rotor which is proportional to the electric current and magnetic flux, i.e. input force as well as the electromotive force of the divided cylindrical semiconductor plate are obtained, a complete non-contact point relay is obtainable.

For instance, when in the case of an overcurrent relay, a circuit to be controlled is opened or closed with an E.M.F. of one volt on the semiconductor plate of the relay according to this invention, and when the exciting current is set at 1 ampere, a current is passed through an alarm circuit, such as a bell circuit, by 0.8 volt E.M.F. corresponding to 0.8 ampere of magnetizing current to give a bell alarm, thus announcing an excessive current and preventing the rail road or rail road utensils from burning and incidental losses by limiting the electric current of the main rail road.

Further, the relay according to the present invention has time-limiting, directional properties and no contact point as described above. Moreover, it is of course, possible that the occurrence of accidents and irregularities is known beforehand and the opening and closing operations are effected. Furthermore, going a step further, it can be utilized in making announcements as an accident-foretelling relay.

In addition, the relay according to this invention is superminute and superlight, that is, its size may be about 2 cm. in diameter and its length is below 4 cm. Thus, volume and weight of the relay are only several tenths of the usual relay. Moreover, a wide range of time-limitation can be obtained most simply; with a minute size and non-contact point construction, upkeep and inspection are not required substantially; and as a low cost relay and all sorts of relays, the present relay can find a wide range of applications, such as for opening or closing devices, automatic control, automatic adjustment and so forth.

The accompanying drawing illustrates one embodiment of the present invention by way of example.

Figure 1:
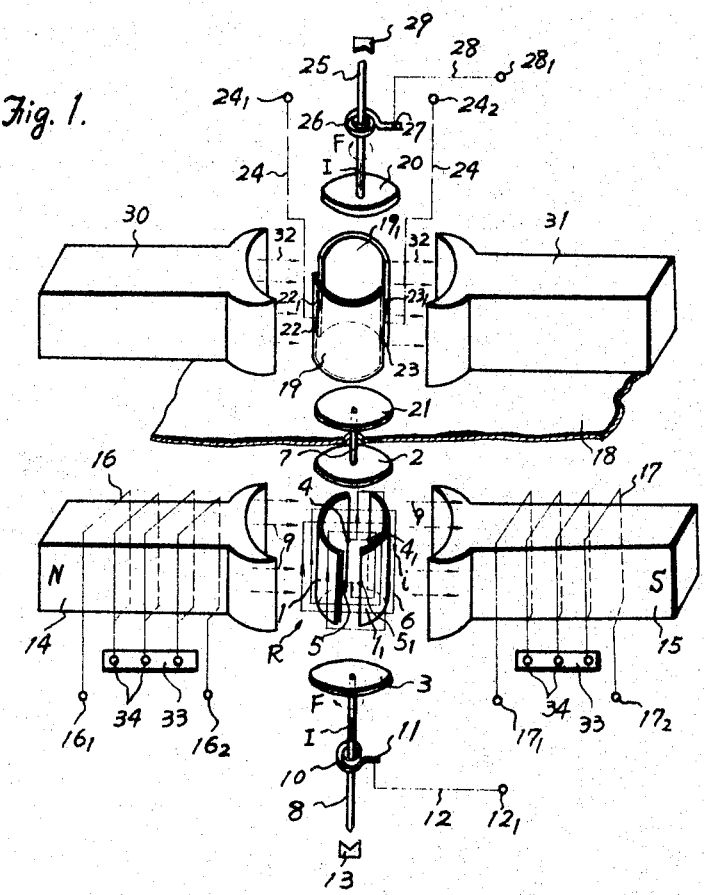
FIG. 1 is an oblique view schematically illustrating the operational principle for the minimum size, non-contact point relay according to this invention.

As is illustrated in FIG. 1, the present invention is embodied in a minimum size non-contact point relay having directional, time-limiting and forecasting properties, wherein lower semiconductor plates 1 and $1_1$ of arcuate section are placed in magnetic fluxes 9 between electromagnets 14 (N-pole) and 15 (S-pole) with disc-shaped electric current terminal members 2 and 3 being provided on the upper and lower end portions, respectively, of the lower semiconductor plates 1 and $1_1$. The main shaft electric current I is passed through the main rotary shaft 7, electric current terminal member 2, lower semiconductor plates 1 and $1_1$, electric current terminal member 3 and main rotary shaft 8. Electromotive force terminal members 4, $4_1$ and 5, $5_1$ are provided in a direction perpendicular to a direction of electric current passing across the lower semiconductor plates 1 and $1_1$. Rotary coil 6 is wound around the curved faces of the lower semiconductor plates 1 and $1_1$, in parallel to the main shaft electric current I and perpendicular to the curved faces. One end of coil spring 10 of good quality phosphor bronze is secured to the main rotary shaft 8 while the other end of the spring 10 is secured to an electrical feeding terminal 11 which is connected to a D.C. current source (not illustrated) by an electrical wire 12. A rotor R comprises the lower semiconductor plates 1 and $1_1$ as well as the rotary coil 6. As illustrated, exciting magnetic coils 16 and 17 are wound around electromagnets 14 and 15 respectively, and electric current taps 34 secured respectively to tap plates 33 are divided into numerous parts so that exciting electromagnetic current may be selectively drawn out intermediately from said coils.

A main rotary shaft 25 is provided in magnetic fluxes 32 between the N-pole 30 and S-pole 31 of a permanent magnet (or an eletcromagnet), coaxially with the main rotary shafts 8 and 7. A pair of upper semiconductor plates 19 and $19_1$ of arcuate arc section are provided in parallel to the main rotary shafts, between the main rotary shafts 7 and 25; and similarly as with lower conductor plates 1 and $1_1$, the upper and lower end portions of the upper semiconductor plates 19 and $19_1$ are secured to electric current terminal members 20 and 21, and the main shaft electric current I flows through the main rotary shaft 25, electric current terminal member 20, upper semiconductor plates 19 and $19_1$, electric current terminal member 21 as well as the main rotary shaft 7. Further, with the upper semiconductor plates 19 and $19_1$, electromotive force terminal members 22, $22_1$ and 23, $23_1$ are connected perpendicularly to the main shaft electric current I, either in parallel or series and such electromotive force terminal members are respectively connected with light flexible wires 24. The main rotary shaft 25 is fixed with one end of a coil spring 26 made of a good quality phosphor bronze, while the other end of spring 26 is fixed with a current supplying terminal 27 which is connected to a D.C. source (not illustrated) by wire 28.

As is apparent from the foregoing descriptions, the fixing positions for current feeding terminals 11 and 27 can be shifted suitably so as to control the breaking forces of coil springs 10 and 26, whereby the time-limit may be adjusted as desired. In this case, the main shaft electric current I is a current passing through a circuit from an unillustrated D.C. source, coil springs 26 and 10 and lower semiconductor plates 1 and $1_1$. In FIG. 1 shafts 8 and 25 are rotated in bearings 13 and 29; 18 represents a metallic insulating plate for the magnetic insulation between the upper and lower electric poles; $16_1$, $16_2$ and $17_1$, $17_2$ respectively represent connecting terminals for exciting magnetic coils 16 and 17; $24_1$ and $24_2$ are connecting terminals of the wires 24; and $12_1$ and $28_1$ show respective connecting terminals of wires 12 and 28 for main shaft electric current circuit.

The upper and lower semiconductor plates 19 and $19_1$, as well as 1 and $1_1$, are suitably made of metals, for instance, germanium, or intermetallic compounds, such as indium antimonide or indium-arsenide. Furthermore, in order to put together the magnetic fluxes 32 and 9, both faces for each of the upper and lower semiconductor plates are insulated from curved face bodies and sandwiched with curved metallic plates of high magnetic permeability, or provided with an iron core (not illustrated) in the middle portion of each of said upper and lower semiconductor plates, thereby, of course, increasing the electromotive force of the upper and lower semiconductor plates.

With respect to the above construction showing the principle of the present embodiment, the manner of operation is explained as follows:

With reference to FIG. 1, when the main shaft electric current-terminals $28_1$ and $12_1$ are connected with an unillustrated D.C. electric source + or −, the main shaft electric current I flows across the main shaft electric current circuit extending from connecting terminal $28_1$ of the wire 28 of the main shaft electric current circuit, feeding terminal 27, coil spring 26, main rotary shaft 25, electric current terminal member 20, upper semiconductor plates 19 and $19_1$, as well as the electric current terminal member 21, and further, extending through the main rotary shaft 7, electric current terminal member 2, lower semiconductor plates 1 and $1_1$, electric current terminal member 3, main rotary shaft 8, coil spring 10, feeding terminal 11, electrical wire 12 and the connecting terminal $12_1$.

When the lower semiconductor plates 1 and $1_1$ and the upper semiconductor plates 19 and $19_1$ are fixed with the main rotary shafts 25, 7 and 8 at mutually perpendicularly intersecting positions as illustrated, and the main shaft electric current I is passed by means of D.C. electric source (not illustrated) through the pair of upper and lower semiconductor plates, and particularly if D.C. exciting electromagnetic current is passed through the exciting magnetic coils 16 and 17 by connection with an electric circuit of a protected circuit to pass D.C. exciting electromagnetic current, for instance, in the case of an overcurrent relay, the magnetic fluxes 9 will be generated in the arrow direction by electromagnets 14 and 15, that is, along a direction from the left to right as viewed in FIG. 1 of the drawing, whereby the lower semiconductor plates 1 and $1_1$ will receive the maximum of the magnetic fluxes 9 with a positive electromotive force at the electromotive force terminal members 4 and $4_1$ and a negative electromotive force at terminal members 5 and $5_1$.

Also when the electric current of the protected circuit is D.C., for instance, in an overcurrent relay, as described above, the secondary circuit of a rectifier (not illustrated) for the protected circuit is connected with the exciting magnetic coils 16 and 17 to flow exciting electromagnetic current. Furthermore, in the case of an overvoltage relay, the secondary circuit of a voltage rectifier (not illustrated) is connected with coils 16, 17 and magnetically excited with proportional electric current; thus magnetic fluxes 9 give rise to A.C. magnetic fluxes by electromagnets 14 and 15 whereby positive and negative electromotive forces alternately occur on the E.M.F. terminal members 4, $4_1$ and 5, $5_1$. However, the rotary force F can always rotate the main rotary shaft in the direction of arrow so that this relay may be used as a relay for use both in A.C. and D.C., without altering the mechanism.

Moreover, a relay can also be provided by passing electric current from the controlled circuit respectively through the main shaft current and exciting magnetic coil. For instance, when the controlled circuit is D.C., electric current may be passed through the main rotary shaft and exciting magnetic coil by connecting alone, or series or parallel connections. When the controlled circuit is A.C., the main shaft current is D.C. which is obtained by another electric source or by rectifying the controlled circuit; and similarly as described before, a relay can be provided by passing electric current from the controlled circuit respectively through the main rotary shaft and exciting magnet coil, alone or series or parallel connections.

When electromagnets are used in place of permanent magnets, a power relay can be provided by connecting the magnetic exciting coil respectively with the electric current and voltage circuits of the controlled circuit; for instance, the electric current circuit with the upper magnetic exciting coil (not illustrated) and the electric current proportional to the voltage with the lower magnetic exciting coils 16 and 17.

The rotary angle of the main rotary shaft 25 can be easily shown by providing an indicator and graduation plate (both are not illustrated) on the main rotary shaft when intended to use it as a forecasting relay for instance, if the maximum value for E.M.F. terminal members $24_1$ and $24_2$ is set as 1 volt, and an alarming circuit operable at 0.8 volt (not illustrated) is connected with outer portion of the E.M.F. terminal members $24_1$ and $24_2$, and if said graduation plate is set as to coincide with the alarming point, the arrangement obtains a very convenient relay for operating as a meter relay.

Thus, as described before, the main rotary shaft of this relay passes through the rotor and electric current terminal member. Therefore, it is not easy to set the rotary center, and accordingly in practice one main shaft is used for the main rotary shafts 25, 7 and 8, of which the outer periphery is insulated and the coil spring, electric current terminal member and rotor are arranged on the outer periphery as illustrated and each respective aperture between them is connected with wires (not illustrated.)

The lower semiconductor plates 1 and $1_1$ are positioned perpendicularly in relation to D.C. magnetic fluxes 9 on start and electromotive forces are produced which are proportional to the product between the main shaft current I and magnetic fluxes 9, in such a way that E.M.F.+ occurs on the electromotive force terminal members 4 and $4_1$ and E.M.F.— occurs on the electromotive force terminal members 5 and $5_1$. The current I passes through the rotary coil 6 in the direction of the arrows and simultaneously the rotary force F occurs which surmounts the braking force of the coil springs 10 and 26 to start; as a result, the main rotary shafts 8, 7 and 25 begin to rotate in the direction of the arrows, and turn round 90° until a halting point (not illustrated) is reached.

In overcurrent relays, since there are numerous electric current taps 34 for the magnet exciting coils 16 and 17, when any suitable tap is selected, the main rotary shaft will begin to rotate, for the reason that when the exciting currents passing through such magnet exciting coils 16 and 17 reach respectively above each of the set values for the electric current taps, the rotary force F will overcome the braking forces of the coil springs 10 and 26 mounted on the main rotary shafts 8 and 25. In consequence, the upper semiconductor plates 19 and $19_1$, which are placed perpendicularly to the lower conductor plates 1 and $1_1$, on the starting, are parallel to magnetic fluxes 32 of the arrow direction caused by permanent magnets (or electromagnets). As a result, no electromotive force occurs on the electromotive force terminal members 22 and $22_1$ as well as 23 and $23_1$. However, when the lower semiconductor plates 1 and $1_1$ commence to rotate, the upper semiconductor plates 19 and $19_1$ mounted on the same shaft will come to receive magnetic fluxes 32 first from a parallel position to the fluxes 32 and gradually on the curved faces of the semiconductor plates 19 and $19_1$, which results in a +E.M.F. on the E.M.F. terminal members 22 and $22_1$ and a —E.M.F. on the E.M.F. terminal members 23 and $23_1$. The relay is stopped at the maximum value of such E.M.F. after turning round 90°. Accordingly, the circuit may be opened or closed depending on the output of this relay by connecting the terminals $24_1$ and $24_2$ of wire 24 with various types of control instruments, such as a circuit breaker and the like.

However, if, in the present relay which is constructed as mentioned above, the curved faces for the upper semiconductor plates 19 and $19_1$ as well as the lower semiconductor plates 1 and $1_1$ are places perpendicularly to the magnetic fluxes 32 and 9, or the upper semiconductor plates 19 and $19_1$ and permanent magnets 30 and 31 are eliminated, and then if the leading wire 24 is connected to the E.M.F. terminal members 4, $4_1$ and 5 and $5_1$ of the lower semiconductor plates 1 and $1_1$, that is, the wire 24 is connected in parallel with the rotary coil 6, the electromotive force will become smaller with the progress of rotation, whereby the controlled circuit is automatically opened and closed. Thus, this relay can also serve as one for automatic controlling.

When the magnetic exciting current passing through the exciting coils 16 and 17 exceeds the set value, the rotary force F forms on the main rotary shafts 8, 7 and 25. Accordingly, in the main rotary shafts, for making the required time further adjustable and accurate from zero to the maximum value in a certain interval of time, the fixing positions of the feeding terminals 27 and 11 may be shifted, depending on the braking force of coil springs 10 and 26, to a position for weakening both braking forces or either one braking force of the coil springs. Then, the rotating time for the rotor R comprising the lower semiconductor plates 1 and $1_1$ and the rotary coil 6 is quickened from one-several tenths to one-several hundredths of seconds and the rotating time may be shorter by strengthening the braking forces and becomes from several seconds to several tens of seconds. Therefore, any desirable operation time i.e. time-limit, can be set accurately.

As referred to later, referring to the lower semiconductor plates 1 and $1_1$, if said lower semiconductor plates are of N-type obtained by the action of the main axial current I and magnetic fluxes, i.e. Hall effects, as described before, the flow of electrons (unillustrated) will be deflected by Rorenz's force, consequently by the direction of electron flow will be curved from E.M.F. terminal members 4 and $4_1$ to the current terminal member 2 (in the direction from the current terminal member 3 to E.M.F. terminal members 5 and $5_1$). Consequently, the path of electric current I passing through rotary coil 6 equivalently extends from the electric current terminal member 2 to the current terminal 3 through E.M.F. terminal members 4 and $4_1$. Thus, in the present relay, the lower semi-conductor bodies 1 and $1_1$ being eliminated, one of the terminals of rotary coil 6 is connected with the current terminal member 2 and the other of the terminals of rotary coil 6 is connected directly to the current terminal member 3; other induction type rotary bodies, may be utilized, being of course constructed to constitute relays.

From the foregoing description, since semiconductor plates of circular arc section are used according to the present improved embodiment, an extremely small and light weight relay can be manufactured. For instance, the size is approximately 3 cubic centimeters and the weight is above one-several tenths of usual relay. Moreover, as instantaneous over-current is passed through the magnetic exciting coils 16 and 17 and consequently electromotive force occurs in the upper semiconductor plates 19 and $19_1$ on account of the revolutional inertia of the rotary coil 6 which is liable to rotate to the maximum value of the E.M.F.; for example, a braking magnet as used in the usual relay and a rotary disc having numerous small holes (neither of them illustrated) are mounted on the main rotary shaft 8, to obtain a braking action as well as a constant velocity rotation.

The operational behaviors of the relay referred to above have been described above, by way of example, with respect to overvoltage relays, while the relay according to the present improved embodiment may, of course, be used as an overcurrent relay and also used for the other overvoltage, differential-, electric power-, grounding-, deficient voltage-, ground circuit- and short circuit-relays, or for a pilot wire relay, impedance relay and the like, by combining several above-mentioned relays.

In the following, the construction and operation of the relay according to the present improved embodiment of this invention are outlined in reference to the manner in which it is operated as follows:

For instance, when the relay according to this improved embodiment is used for a differential relay, there is a method, wherein, as entirely similar to the usual process, two convertors are connected differentially with each other in series, and then said relay is bridged thereto as an overcurrent relay. However, when the exciting current is passed reversely through the magnetic exciting coils 16 and 17 of this relay respectively by two converters, so that the magnetic fluxes may be mutually compensated. Then, as the magnetic fluxes are normally passed in mutually reverse directions, the electromotive force does not occur on the lower semiconductor plates 1 and $1_1$, while if the electric current passing through one convertor becomes large, electromotive force occurs on the lower semiconductor plates and the rotor R begins to rotate, the direction of which rotation changes depending on the direction of the magnetic exciting current. Thus, directional, magnetic-equilibrium type differential relays are obtainable, the rotary direction of which may be changed according to the direction of the exciting electric current.

Moreover, the present relay operates not only upon the intensity of the electric current passing across said relay, but also upon the capacity of recognizing the direction of the electric current, in other words, as it possesses a directional property for electric current, the present relay may be also used for a reverse power relay.

For instance, when the direction of the magnetic exciting electric current passing across the exciting coils 16 and 17 or the main shaft electric current I becomes reverse, the electromotive force generated on the lower semiconductor plates becomes — on the E.M.F. terminal members 4 and $4_1$ and similarly + on the E.M.F. terminal members 5 and $5_1$: therefore, the rotary force F acts in the reverse direction, and as a result, the upper semiconductor plates 19 and $19_1$ rotate also in the reverse direction and consequently the electromotive force generated on the E.M.F. terminal members 22 and $22_1$ is + and similarly the E.M.F. — is generated on the E.M.F. terminal members 23 and $23_1$. Thus, the direction of electric current passing through the protected circuit or convertor may be recognized according to the polarity of the electromotive force generated on the fixing terminals $24_1$ and $24_2$ of wire 24 of the output circuit. Therefore, a directional relay may be obtainable, which is extremely effective particularly when damaged places are intended to be shut off selectively.

When the present relay is used as an automatically controlling relay, the magnetic exciting coils 16 and 17 are excited by a certain loading electric current, wherein with respect to this fixed rotary angle the positions of the permanent magnets (or electromagnets) 30, 31 are so shifted that the upper semiconductor plates 19 and $19_1$ may become parallel to the magnetic fluxes 32, and if the loading electric current increases above the fixed value and the rotary angle of the rotor R becomes high, the upper semiconductor plates 19 and $19_1$ will begin to receive magnetic fluxes 32 on the curved plate face, while the electromotive force + occurs on the E.M.F. terminal members 22 and $22_1$ and similarly the electromotive force — occurs respectively on the E.M.F. terminal members 23 and $23_1$. Moreover, when said electromotive force decreases below the predetermined value, the rotary angle becomes also small, but as the upper semiconductor plates 19 and $19_1$ will come to receive the magnetic fluxes 32 on the both faces thereof, the electromotive force — occurs on the electromotive force terminal members 22 and $22_1$, and similarly the electromotive force + occurs respectively on the terminal members 23 and $23_1$. Accordingly, when to the fixing terminals $24_1$ and $24_2$ for the electric wire 24 are respectively connected operational circuits (not illustrated) for various automatic control, the electric current passed across the operational circuits becomes positive vs. negative according to the increase vs. decrease of said loaded electric current. Therefore, in this relay, for instance, the electrical and mechanical quantities may be automatically controlled and adjusted.

Figure 2:
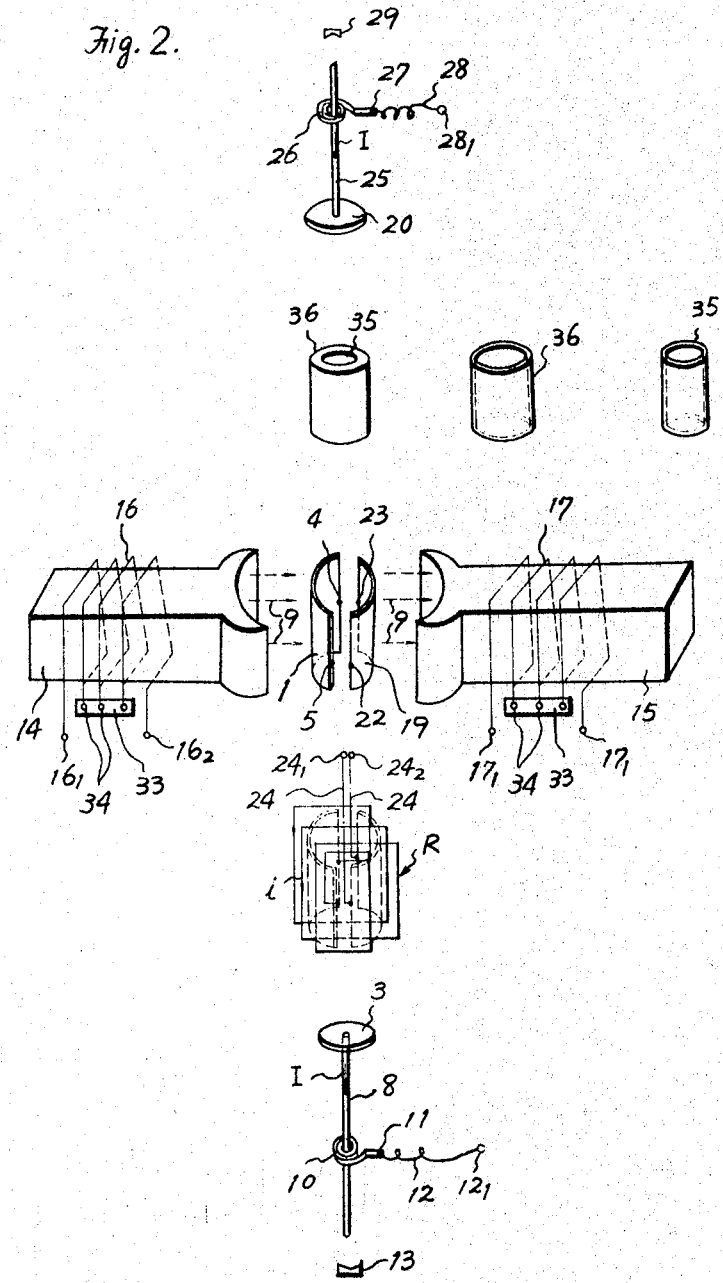
FIG. 2 is an oblique view of the said relay as shown theoretically and schematically in FIG. 1, illustrating same schematically and as developed, whereby the upper magnet and upper semiconductor plate are omitted and the two lower semiconductor plates are used respectively as a rotary coil and output electrical wire.

In FIG. 2, an embodiment is shown in an oblique view illustrating schematically and in developed view of the case, wherein the upper magnets 30, 31 and the upper semiconductor plates 19, $19_1$ of FIG. 1 are eliminated and one lower semiconductor plate $1_1$ is used for the output wire 24.

In the present embodiment, similarly as the embodiment illustrated in FIG. 1, a heat resistant hollow cylindrical body 36 having a cylindrical iron core 35 is made of insulated material such as glass, synthetic resin and the like, and around its outer periphery are the semiconductor plates which are divided in two portions (or a plurality of portions) and which are made of suitable material, such as germanium or indium-antimonide or indium-arsenide etc. that are fixed by the vacuum evaporation process. Thus the two semiconductor plates 1 and 19 of circular arc section are arranged similarly to the semiconductor plates 1 and $1_1$ of FIG. 1, as if the semiconductor plates 1 and 19 were embraced with the coil 6. The electromotive force terminal member 5 of semiconductor plate 1 is connected to one end of the coil 6 and the other end of the coil 6 is connected with the electromotive force terminal member 4 to constitute the rotor R which is placed in the magnetic fluxes 9 of the electromagnets 14 and 15; the E.M.F. terminal members 22, 23 of the semiconductor plate 19 are connected respectively with the output wire 24. The electric current terminal members 20, 3 are provided on the upper and lower portions of the semi-conductor plates 1 and 19, and are provided respectively with the main rotary shafts 25, 8 arranged upright.

Thus, the present embodiment is obtainable with such a construction sufficient to accomplish the similar object that is accomplished by the construction of the relay shown in FIG. 1. The function of this embodiment will be described as follows: For instance, when such a relay is intended for use as an overcurrent relay, a predetermined D.C. current is passed across an electric current circuit extending from the main rotary shafts 25, 8 to the semiconductor plates 1 and 19 of circular arc section, and if the D.C. or A.C. electric current of the protected circuit is passed across the magnetic exciting coils 16 and 17, the electromotive force of the semiconductor plate 1 is increased with the increase of said circuit current, whereby the electric current I in the rotary coil is increased and the rotor R is rotated. The electromotive force of the semiconductor plate 19 for a certain angle of rotation is set and the outer circuit of a similar output electric wire 24 shown in FIG. 1 is shut off, whereby the relay may be used as an overcurrent relay.

Figure 3:
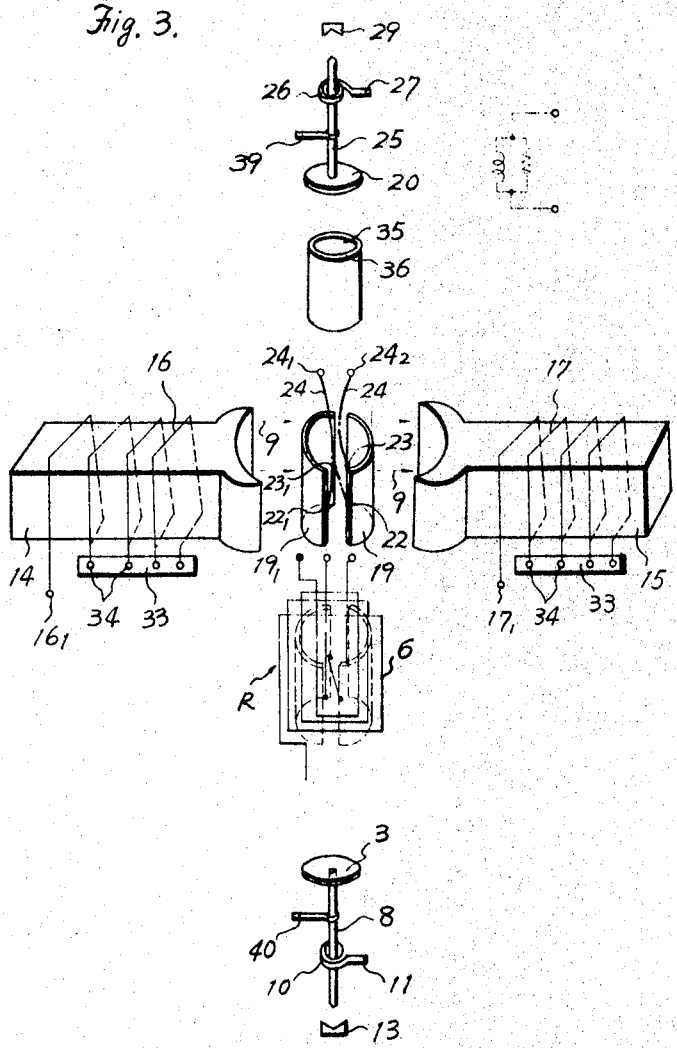
FIG. 3 is a oblique view, of the relay as shown in FIG. 2, showing schematically as developed, whereby the two semiconductor plates are used for output current and the rotary coil is directly connected to a main rotary shaft.

In FIG. 3, an embodiment is illustrated in an oblique view schematically and in a developed view, wherein starting from the construction represented in FIG. 1 the electromotive force terminal members 22, 23 of the upper semiconductor plates 19 and $19_1$ of circular arc section are connected in series (or in parallel) with $22_1$ and $23_1$ thereof, and the rotary coil 6 is connected with electric current terminals 39 and 40 for rotary coils provided on the main rotary shafts 25 and 8.

In the present embodiment, a relay, as is substantially similar to the embodiment shown in FIG. 2, comprises a heat resistant hollow cylindrical body 36 having an iron core 35; on the outer periphery of the cylindrical body 36, a semiconductor body of the type as referred to above is secured by evaporation in vacuum onto the periphery and divided into two (or a plurality) portions, or semiconductor plates 19, $19_1$ of circular arc section, whereby a rotor R comprises a rotary coil 6 wound around the semiconductor plates 19, $19_1$ as if said coil 6 embraces the plates 19 and $19_1$ with the rotor R being placed between electromagnets or permanent magnets 14 and 15.

During operation of the present embodiment of FIG. 3, the main shaft current I passing through the main rotary shafts 8, 25 flows separately through semiconductor plates 19 and $19_1$ and the rotary coil 6, such main shaft current I also flows directly through such rotary coil 6, with the result that the rotary force is remarkably high as compared with the embodiment shown in FIG. 2. When the magnetic fluxes 9 are D.C. magnetic fluxes, the rotor may rotate in said D.C. fluxes, but the rotor may not rotate in A.C. fluxes, i.e. it can be used as a D.C. relay.

Figure 4:
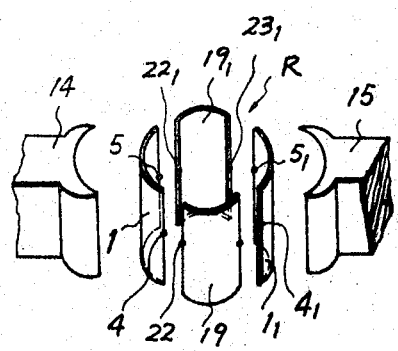
FIG. 4 is an explanatory diagram for the rotor portion of the relay as shown in FIG. 2, whereby 4 semi-conductor plates are used instead of the 2 semi-conductor plates used in the case of FIG. 2 and a pair of the two mutually opposite semiconductor plates is used for output wires, while the other pair of the semiconductor plates is used for rotary coils.

FIG. 4 illustrates schematically a rotor portion of an embodiment, wherein, starting with the embodiment represented in FIG. 2, 4 semiconductor plates are used in lieu of 2 plates, whereby of the oppositely arranged two pairs of semiconductor bodies, one pair is used for the output wires, while the other pair is used for the rotary coils. In this case, particularly with an increase of the rotary angle of the rotor R, the electromotive force increases. Only the semiconductor plates are shown by way of example wherein the periphery is divided into 4 portions and one pair of semiconductor plates 1 and $1_1$ arranged in opposition to each other is connected with the rotary coil 6; the other pair, 19 and $19_1$, is also oppositely arranged connected with output wire 24. Then, since the semiconductor plates 1 and $1_1$, as well as 19 and $19_1$, are mutually perpendicular, the semiconductor plates 19 and $19_1$ begin to receive magnetic fluxes gradually increasing from zero with the rotation from the position shown in FIG. 4 (the position where the maximum magnetic fluxes are received by the surface of the semiconductor plates 1 and $1_1$), hence the electromotive force is increased. Further, the electromotive force terminal members of the semiconductor plates 1, $1_1$ and 19, $19_1$ may, of course, be connected in series or in parallel, as desired.

Figure 5:
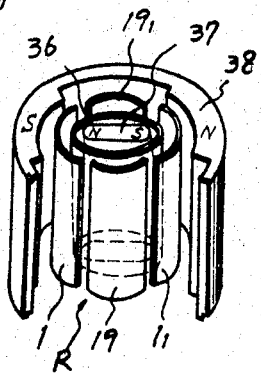
FIG. 5 is an explanatory schematic view of the relay shown in FIGS. 1 to 4, wherein the rotor portion is of an outer iron type, while only rotor portion of an inner iron type is shown respectively.

FIG. 5 illustrates an inner iron type relay, while the embodiment shown in FIG. 4 is an outside iron type. In this case, only the semiconductor plates and magnets are shown. According to the present embodiment, the arrangement illustrated in FIG. 4 may be further made smaller and the function and result are the same as that shown in FIG. 4. Namely, a hollow cylindrical body 36 having an electromagnet 37 inside thereof (or permanent magnet) is made of insulating material, such as heat resistant glass, synthetic resin and the like. The outer periphery of body 36 has a similar semiconductor body secured thereto by evaporation under vacuum around the circumference and is divided in 4 portions, whereby each respective E.M.F. terminal members 4, 5 and $4_1$, $5_1$ for one oppositely arranged pair of semiconductor plates 1, $1_1$ are connected to the rotary coil 6, and E.M.F. terminal members 22, 23 and $22_1$, $23_1$ for the other oppositely arranged pair of semiconductor plates 19 $19_1$ are connected to the output wire 24. This construction defines an inner iron type relay which comprises a rotor R including the semiconductor plates and rotary coils and a stator S including the electromagnet 37 and an iron member 38.

In the foregoing description, the construction, functions and uses of the relay according to the present invention are roughly set forth. Furthermore, the present relay is, of course, used for widespread other uses, such as for instance, a transistor D.C. multiplication circuit; a magnetic multiplication circuit; a two step multiplication circuit combining a transistor multiplier and magnetic multiplier; a three wire 3 phase type over-current protecting relay type, differential electric relay type for all electic supplying bus bars; differential relay type and reaction kettle etc. in the synthetic chemical industry and other electrical, mechanical automatic controlling devices.

Furthermore, the output of the relay of each embodiment referred to above is very easy to amplify because it is A.C. current. For instance, when the upper magnets 30, 31 of FIG. 1 are excited by A.C. or D.C. exciting electric current across the magnetic exciting coils 16 and 17 of FIG. 2, A.C. electromotive force occurs respectively on the E.M.F. terminal members of the semiconductor plates 19 and $19_1$ (FIG. 1) or 19 (FIG. 2), and therefore, it is very easy to amplify said output. The output of the present relay, which is amplified by an amplifier (not illustrated) is converted into D.C. by a rectifier, and when the gate of such a silicon controlled rectifier is controlled by said D.C., the main electric current of the rectifier and its protected machines and instruments can be easily operated as by a large current breaker of 10 to 20 amperes.

Further, in the present embodiment of this invention, as semiconductor plates of circular arc section are used in lieu of semiconductor plates, the air resistance is low during the rotation, and accordingly the relay running time becomes shorter, whereby a relay of an excellent performance can be obtained and simultaneously when vacuum-evaporization is used, a most effective thin film can be easily obtained.

What I claim is:

1. In a non-contact electrical relay the combination comprising spaced magnetic poles, electroconductive rotary shaft means operatively disposed between said spaced magnetic poles, said shaft means including electrical terminal connector means and semiconductor plate means, means mounting said shaft means on a rotary axis perpendicular to flux lines between said spaced magnetic poles, rotary coil means secured to said shaft means for rotation therewith and having a pair of electric leads, said semiconductor plates means comprising a hollow cylindrical body divided into a plurality of arcuate portions, each arcuate portion defining a pair of spaced edge faces, said arcuate portions being disposed with the edge face of one arcuate portion being opposed to the edge face of an adjacent arcuate portion, an electromotive force terminal member for each edge face of the semiconductor arcuate portions, an electrical connection between an electromotive force terminal member on one arcuate portion and an electromotive force terminal member on another arcuate portion, electrical connection means between one electric lead of said rotary coil means and one electromotive force terminal member, and electrical connection means between the other electric lead of said rotary coil means and another electromotive force terminal member.

2. The combination as recited in claim 1 wherein said hollow cylindrical body comprises a heat resistant hollow cylindrical body of electrical insulating material and having a cylindrical iron core.

3. The combination as recited in claim 1 wherein said semiconductor plate means comprises a hollow cylindrical body divided into four arcuate portions spaced from each other to define a rotary body, and said rotary body is disposed between said magnetic poles in perpendicular relation to flux lines there between to define a Hall effect device.

References Cited by the Examiner

UNITED STATES PATENTS

| | | | |
|---|---|---|---|
| 2,536,805 | 1/1951 | Hansen | 310—10.1 |
| 3,083,314 | 3/1963 | Ratajski | 310—10.1 |

RICHARD M. WOOD, *Primary Examiner.*

ANTHONY BARTIS, *Examiner.*

H. T. POWELL, W. D. BROOKS, *Assistant Examiners.*